May 16, 1967     F. C. BRADSHAW ETAL     3,320,508

BATTERY AND CHARGING CIRCUIT CARTRIDGE

Filed Sept. 3, 1964

INVENTORS
FRANKLIN C. BRADSHAW
TERRANCE M. SMITH

BY Marvin Jacobson
ATTORNEY

United States Patent Office 3,320,508
Patented May 16, 1967

3,320,508
BATTERY AND CHARGING CIRCUIT CARTRIDGE
Franklin C. Bradshaw, Minneapolis, and Terrance M. Smith, St. Paul, Minn., assignors to Gould-National Batteries, Inc., St. Paul, Minn., a corporation of Delaware
Filed Sept. 3, 1964, Ser. No. 394,219
13 Claims. (Cl. 320—2)

This invention relates to batteries of the rechargeable flashlight variety and circuits for recharging this type of battery. In particular the invention is directed toward a unitary cartridge assembly containing a rechargeable battery cell pack for providing battery power and a charging circuit for use when it becomes necessary to recharge the cells.

In general the cells with which this invention is principally concerned are of the elongated, cylindrical nickel-cadmium variety. These cells are contained in an elongated cylindrical cartridge casing in end-to-end relationship to provide a series circuit of battery power. By incorporating the battery charging circuitry along with external connections for coupling the charging energy into the circuit together with the battery pack itself in a unitary cartridge assembly, the use of rechargeable cells is greatly enhanced. With a unitary cartridge assembly of this type, the cartridge can be inserted into the body of a flashlight or similar battery-operated device to provide the driving or operating power. When it becomes necessary to recharge the batteries the cartridge can be readily removed from the device and an external connection, such as prongs of an ordinary electrical plug, inserted into the common A.C. wall receptacle and the batteries will be automatically recharged. It can be visualized, therefore, that compactness of the components within the cartridge assembly is of principal importance to permit use of the cartridge in flashlights and similar types of devices where space is at a premium.

Although there are a variety of battery charging circuits that can be utilized, it has been found desirable to utilize a charging circuit containing a resistor-capacitor (RC) combination which feeds a full-wave rectifier to develop the D.C. energy which is applied to charge the batteries. Heretofore, however, for most applications, it has been necessary to use a transformer input instead of a capacitor because the construction of the latter has been too bulky at the required capacitance. It is preferable to use a capacitor input because of the many advantages it has over the transformer input circuit including: lower heat dissipation thereby maintaining the ambient temperature within the cartridge at a lower level; less weight which is a factor in miniature devices and when shipping large quantities of these items; virtual constant charging current during the entire charging period for the battery; and negligible effect on the charging current due to voltage fluctuations in the input A.C. line during charge.

It is a general object of this invention to provide a battery pack and a battery charging circuit in a unitary cartridge assembly employing a capacitor input in the charging circuit.

A more specific object of this invention is to provide a unitary cartridge assembly as described above containing an annular capacitor with the battery cells contained within the annular opening through the capacitor.

Yet another object of this invention is to provide a battery pack and charging circuit in a unitary cartridge assembly of a standard size but capable of incorporating battery cells of a variety of sizes.

When used as a battery pack in a flashlight or other battery operated device, at least a portion of the externally accessible casing of the cartridge is connected to one of the electrodes, generally the negative electrode of the battery cell pack. In this way the cartridge assembly simulates a pair of batteries and the electrical connections between the devices and the cartridge are made in the same manner as if only the battery cells themselves were inserted. When it becomes necessary to recharge the battery cells and the cartridge is removed from the device and plugged into a common A.C. wall socket, the electrical connection to the exposed casing of the cartridge from the negative electrode of the battery cell produces a hazard since the exposed portion of the casing may be electrically hot, on the order of 120 volts at 60 c.p.s.

It is a further object of this invention to provide a battery pack and charging circuit in a unitary cartridge in which no portion of the exposed casing of the cartridge is electrically hot when the batteries are being charged.

Still another object of this invention is to provide switching means within a cartridge asembly of the variety described above for automatically disconnecting any externally exposed portion of the casing from the charging circuitry when the batteries are being charged.

These and other features and advantages of this invention will become obvious during the course of the following detailed description with reference to the accompanying drawings in which.

Figure 1:
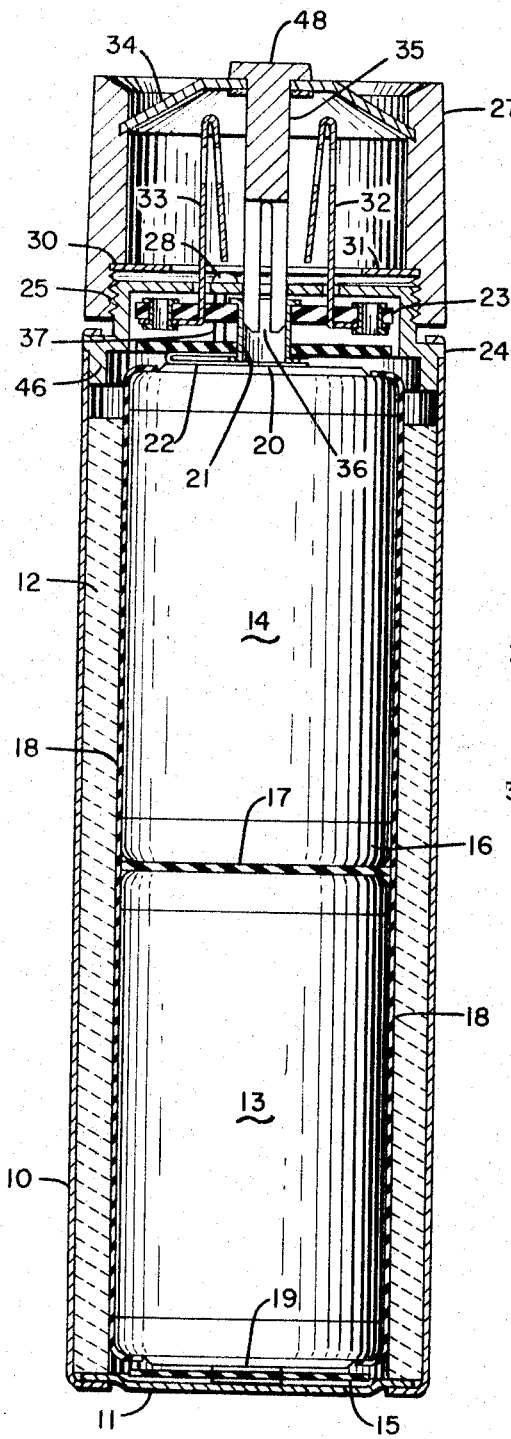
FIG. 1 is a side sectional view showing detailed construction of a preferred embodiment of this invention.

Referring to FIG. 1, there are shown details of the cartridge assembly. An elongated hollow cylinder casing 10 may be constructed from any suitable material, metal or otherwise. At the bottom of the casing 10 lies a metallic disk 11 which may be either in direct contact with the casing 10 along its periphery, as illustrated in the drawing, or may be suitably insulated therefrom. If the casing 10 is metal, it is preferable that the disk 11 be insulated therefrom so that the entire outer casing does not constitute a connection to the negative electrode of the battery pack. In any event, at least the bottom of the casing, disk 11, is exposed for external electrical connection. An elongated annular cylindrical capacitor 12 is contained within the casing 10 forming an inner shell thereof and holds the bottom disk 11 in place. The overall length of the capacitor is slightly less than that of the outer casing 10. In a typical case the capacitor may be 3.5 inches long and have an outer diameter of 1.285 inches and an inner diameter of 1.030 inches while the casing 10 may be ¼ inch longer. These dimensions, of course, are only intended to be illustrative and not limitive. A pair of cylindrical nickel-cadmium rechargeable batteries or cells 13 and 14 of the flashlight variety are contained within the opening through capacitor 12 so that the capacitor in effect serves as an outer shell encasing the batteries or an inner shell for the outer casing. The base or bottom of the lower battery cell 13 is separated from the metallic disk 11 by an insulator 15. A stacking cup at 16, an insulating spacer at 17 and insulating sleeve 18 may be included to stabilize the position of the batteries within the cartridge shell. Cells of a variety of physical sizes can be assembled into a standard size cartridge casing and capacitor assembly by suitable use of spacers and the like. It is common practice that the bottom or base of each of the cells constitutes the negative electrode of the battery cell while the positive electrode in the shape of a raised button portion is located at the top of the cell. The cells 13 and 14 are arranged in end-to-end relationship so that the positive electrode of cell 13 is in direct contact with the negative electrode of cell 14 so that the cells are electrically connected in series to form a two-cell pack. The negative terminal of cell 13 is shown at 19 and the positive electrode of cell 14 is located at 20.

Figure 2:
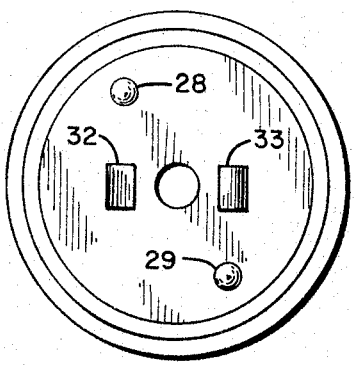
FIG. 2 is an end view of the cartridge assembly with the removable cap removed.

A hollow, metallic, cylindrical insert 21 is centrally located with respect to and extends upward from the positive electrode of cell 14 and is electrically connected thereto by a strap 22. The insert 21 is press fitted through the center of a disk-like printed circuit board 23, details of which are more clearly shown in FIG. 4. A retainer 24 which may be press fitted or otherwise permanently attached to the inner surface of the outer casing 10, such as shown at 46 holds the insert 21 along with the printed circuit board 23 and the associated components in their relative positions. The partial inner threads 25 of a removable cylindrical cap 27 are engaged with the partial outer threads on the retainer. The cap 27 can be removably attached to the retainer by other means such as by snap-lock or twist-lock construction, and a pair of electrical contacts 28 and 29, FIG. 2 (contact 28 partially shown in FIG. 1), jut out above and are insulated from the retainer 24. A suitable conductor, not shown, such as a flat wire is insulated along its length and electrically connects contact 28 to the negative terminal 19 of cell 13. In the same manner contact 29 is electrically connected to the disk 11 at the bottom of the cartridge by an appropriate insulated conducting wire. The electrical conductors forming these circuit paths are contained inside the casing of the cartridge. Butting against an inner shoulder 30 of the removable cap 27 is a metallic ring 31 which, when the cap is threaded onto or otherwise engaged with the retainer 24, electrically connects together the two contacts 28 and 29. This closes the circuit path from the negative electrode 19 to the outer disk member 11 of the cartridge casing. When the cap 27 is removed then the circuit path is open so there is no electrical connection external to the cartridge to the negative side of the battery pack.

A pair of electrically conductive prongs, 32 and 33, such as may be found in the ordinary household appliance plug, extend upward from electrical connection at the printed circuit board 23 and pass insulatively through the retainer 24 and the contact ring 31. These prongs are preferably of the well known variety which can be readily inserted into the ordinary A.C. wall socket. A partially beveled cover 34 is press fitted into the inner wall of the cap 27 and contains a centrally located contact pin 35 which extends from its head 48 on the cover 34 into electrical contact wtih the insert 21. This provides an external electrical connection to the positive electrode of the battery pack contained in the cartridge. It can be visualized then that with the cap 27 removed so that pin 35 is withdrawn from contact with insert 21 there is no externally exposed contact point for the electrical circuit to the positive anode of the battery pack contained within the cartridge assembly. Preferably the contacting end of the pin 35 is split and wedged outward and has a taper as illustrated at 36. When the cap 27 is threaded onto the retainer 25 the pin 35 then makes a pressing electrical contact within the insert 21 thereby ensuring a low resistance electrical contact to the positive terminal of the battery pack. A pair of leads 37 from the capacitor extend upward from the top of the capacitor to the printed circuit board 23 to make electrical connection thereto.

In normal use as a source of battery power, the removable cap 27 is attached to the retainer 24 of the cartridge assembly as shown in FIG. 1 so that the prongs 32 and 33 are enclosed, pin 35 is in electrical contact with the positive anode of the battery 14 through the insert 21 and strap 22, and ring 31 closes the electrical path between contacts 28 and 29 thereby placing the bottom disk 11 in electrical contact with the negative electrode of battery cell 13. The cartridge assembly is then inserted into the body of the utilization device, such as a flashlight or the like, and the series connection of the two battery cells 13 and 14 provides the energy to operate the device in a manner as if the cells alone were inserted. When it becomes necessary to charge these batteries the cartridge is removed from the utilization device and the cap 27 is unscrewed or otherwise removed from the retainer 24 to expose the prongs 32 and 33. Removal of the ring 31 along with the cap removes the external contact to the positive and negative electrodes of cells 14 and 13 respectively. The prongs are then inserted into the ordinary A.C. wall socket through which energy is transmitted to suitable electrical circuitry to provide charging energy for the battery cells 13 and 14.

Figure 3:
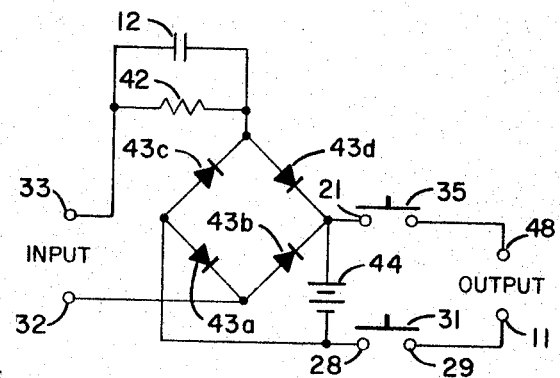
FIG. 3 is a schematic of the electrical circuit contained in the cartridge assembly.

FIG. 3 schematically illustrated the electrical charging circuit. The input energy is obtained from an ordinary 120-volt, 60-cycle source and is applied to a pair of input terminals which respectively correspond to prongs 32 and 33. The capacitor 12, which may typically be in the order of 3.5 microfarads, is paralleled by a resistor 42 which typically may be in the order of 220,000 ohms and rated at ½ watt. This parallel RC circuit serially connects the prongs 77 to one side of a full-wave rectifier composed of suitably polarized identical diodes 43a–d arranged circuitwise in the well-known manner. The series arrangement of battery cells 13 and 14 is shown symbolically as a battery pack at 44 and the cells are connected to receive the pulsating D.C. output of the full wave rectifier for charging the cells. The positive side of the battery pack 44 is also shown connected to a terminal which would correspond to the insert 21 and through a removable connection (shown symbolically as a switch), corresponding to pin 35, to external contact terminal corresponding to the pin head 48. The negative side of the battery pack 44 is connected to a terminal, which would correspond to contact 28 of FIG. 2, through a removable connection (shown symbolically as a switch), corresponding to ring 31, to another terminal corresponding to 29. From there a suitable electrical connection is made to the output termial corresponding to the bottom disk 11. It can be seen that the electrical circuit from the negative electrode of the battery pack 44 to the externally accessible disk 11 can be selectively switched open and closed through the interconnection between contacts 28 and 29. Ring 31 closes the circuit connection between these contacts only when the removable cap is threaded or otherwise attached to the cartridge assembly. As illustrated in FIG. 3, the circuit is in the condition for operating in the charging mode with external energy being supplied through the prongs 32 and 33 to charge the battery pack. In this condition it can be seen that any normally externally exposed contact to the electrical circuit contained within the cartridge assembly has been removed thereby removing any potential danger to the user from the A.C. high voltage source.

In a typical case a 2.4 volt battery pack consisting of a pair of serially connected 1.8 SC nickel-cadmium cells (1.8 SC denotes relative capacity) was charged with a charging current which stayed within the range of 158 to 160 milliamperes during the entire charging period of 16 hours. Because of its characteristics at the A.C. frequency (60 cycles) at which it was operated, the capacitor generated such a relatively small amount of heat during the charging operation that the ambient temperature within the cartridge assembly rose only 15 degrees above room temperature during this 16 hour charging period. Because of its relatively high impedance at this frequency compared to the internal impedance of the battery cells being charged, the capacitor causes the charging circuit to appear as a constant current source as viewed from the battery cells being charged so that the charging current remained relatively constant throughout the charging period. Furthermore, there is an inherent current limiting safety feature since if any of the cells should short out during the charging period, the charging current would still remain relatively constant instead of jumping up to a high level. Similarly, fluctuations in the line voltage applied to the input terminals will have relatively negligible effect on the charging current applied to the battery pack. In a typical case a three volt fluctuation in the line voltage caused the charging current to vary less than one-half of a milliampere.

Another significant factor is illustrated by considering that in a typical instance the transformer and rectifiers used in comparable circuits heretofore weighed in the order of two ounces. The capacitor-rectifier combination contained in this invention weighs only 1.2 ounces which is a reduction of .8 ounce or approximately 14% of the overall weight of the cartridge assembly. This may not be meaningful as regards single cartridges but is a significant factor when shipping and storing large quantities of these items. In addition to the foregoing, heretofore only cells of physically shorter dimensions could be utilized in a cartridge because of physical limitation. With the new improved structural design of this invention a variety of capacities can be obtained using cells which are standard in the industry rather than requiring the manufacture of cells of special construction.

Figure 4:
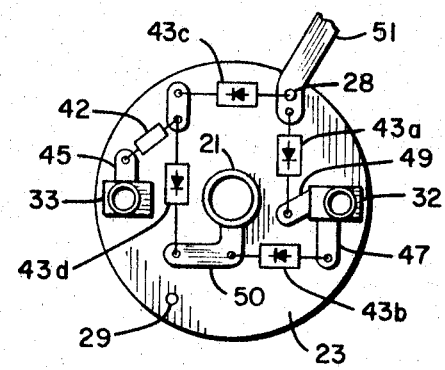
FIG. 4 is a detailed illustration of the printed circuit containing the electrical circuit connections.

Details of the physical layout of the charging circuit on the printed circuit board 23 are shown in FIG. 4. The two electrical insert prongs 32 and 33 are attached at one end to the printed circuit board 23. Prong 33 is electrically connected to one side of resistor 42 through a solder land area at 45, while prong 32 is electrically connected to a pair of diodes 43b and 43a by solder land areas 47 and 49 respectively. The contact 28 is connected to the negative electrode of the battery pack by conductor 51, shown only partially, and is also electrically connected to the anode of diodes 43a and 43c. The insert 21 at the center of the printed circuit disk 23, through which electrical contact is made with the positive electrode of the battery pack, is connected to the cathode of the other pair of diodes 43b and 43d by a suitable solder land area at 50. One of each of the two leads 37 (FIG. 1) from the capacitor 12 are soldered to the printed circuit board at each end of resistor 42 to place the capacitor electrically in parallel with the resistor.

Although in FIG. 4 the solder land areas and the components are shown on the same side of the printed circuit board for illustrative purposes, this need not be the case in actual practice. Preferably the solder areas are on the outer facing side of the board 23 so that after the printed circuit board is assembled to the remainder of the cartridge, the solder connections are accessible. The electrical conductor which makes the electrical connection from contact 29 to the outer exposed disk at the bottom of the cartridge assembly is not shown. It passes through or outside the edge of the printed circuit board 23 without making any electrical connection to the circuit contained therein. As previously described, however, when the removable cap is in place on the cartridge the annular ring 31 closes the electrical circuit connection between the contact 28 and contact 29.

We claim:

1. A battery pack and battery charging circuit cartridge comprising, in combination: an annular casing containing an annular capacitor; at least two battery cells in end-to-end relationship and electrically in series contained in the annular opening of the capacitor; an insulative disc member closing off one end of said capacitor annular opening; electrical charging circuit means including rectifiers, a resistor and circuit connections mounted on said disc; first conducting means for making electrical connections from said charging circuit to said battery cells and said capacitor; second conducting means passing through said disc for making external electrical connections to said battery cells; and third conducting means extending out from said disc for making external electrical connection to said charging circuit.

2. The invention as described in claim 1 wherein said second conducting means comprises: a first conductor passing through said disc into electrical contact with a first polarity electrode of one of the battery cells; a second conductor passing through said disc into electrical contact with a second polarity electrode of another of the battery cells; a third conductor attached to said disc and electrically connected to at least part of the casing; and switching means for selectively electrically connecting said second conductor to said third conductor at said disc.

3. The invention as described in claim 2 wherein said third conducting means comprises a pair of spaced-apart conductive prongs extending longitudinally outward from said disc.

4. The invention as described in claim 3 further including a cap removably attached to said casing for enclosing said disc and said prongs, said cap containing a terminal pin for making electrical contact to said first conductor and means for making electrical connection between said second and third conductors only when the cap is attached to said casing.

5. In a battery pack and battery charging circuit cartridge combination, the improvement comprising: an annular capacitor containing the battery cells lying end-to-end in the opening through the capacitor; an insulative disc at one end of the capacitor opening containing electrical battery-charging circuitry; means for making internal electrical connections between the charging circuitry, the capacitor and the battery cells; means passing through said disc for making external electrical connections to the charging circuit and to the battery cells; and means for disconnecting the external electrical connection to the battery cells whenever an external electrical connection to the charging circuit is made.

6. The invention as described in claim 5 wherein said latter means comprises a cap removably attached to the casing for insulatively covering the external electrical connection to the charging circuit, said cap containing means for opening the external electrical circuit connection to the battery cells whenever the cap is detached from the casing to allow an external electrical connection to be made to the charging circuit.

7. In a unitary cartridge assembly containing a battery charging circuit and battery cells for providing power, with the battery electrodes electrically connected to at least part of the outer casing of the cartridge for providing battery power to an external device, the improvement comprising: an elongated hollow cylindrical capacitor forming an inner shell of the cartridge casing containing the battery cells and in electrical circuit with the charging circuit in the cartridge assembly; means for electrically connecting the cartridge assembly to an external power source for feeding electrical energy to said charging circuit for charging the battery cells; and means for electrically disconnecting the battery electrodes from their outer casing connections whenever the cartridge assembly is electrically connected to said external power source.

8. In a battery pack and charging circuit unitary cartridge assembly, the improvement comprising: an elongated cylindrical cartridge outer casing; a pair of rechargeable cylindrical battery cells lying end-to-end within the casing; an externally exposed, electrically conductive base member at one end of the cells insulated from the cells and the casing; a disc-like printed circuit board mounted at the other end of the battery cells; first conducting means connecting the negative electrode at said one end of the battery cells to a first contact on said printed circuit board; second conducting means connecting said base member to a second contact on said printed circuit board; third conducting means connecting the positive electrode at said other end of the battery cells to a third contact on said printed circuit board; and means removably attached to said casing for electrically connecting said first contact to said second contact and for making an externally exposed electrical connection to said third contact when said means is attached to said casing.

9. The invention as described in claim 8 wherein said printed circuit board contains substantially all of the charging circuit with said first and third contacts being electrically connected to said charging circuit and said second contact being independent of said charging circuit.

10. The invention as described in claim 9 further including a pair of electrically conductive prongs extending outward from electrical connection at said printed circuit board adapted for coupling to an external source of energy for said charging circuit.

11. The invention as described in claim 10 further including an elongated annular capacitor forming an inner shell for said casing, with said battery cells contained within the annular opening, said capacitor being electrically connected to said charging circuit.

12. The invention as described in claim 10 wherein the means removably attached to said casing comprises a cap member which insulatively encloses said prongs when the cap is attached to said casing.

13. The invention as described in claim 12 wherein said cap member isolates the prongs from said external source of energy only when the cap is attached to the casing and removes the external connections to the battery cell electrodes only when it is detached from the casing.

References Cited by the Examiner

UNITED STATES PATENTS

| 792,443 | 6/1905 | Morwitz | 317—242 |
| 2,876,410 | 3/1959 | Fry | 320—2 X |
| 3,013,198 | 12/1961 | Witte et al. | 320—2 |
| 3,028,536 | 4/1962 | Bilsky | 320—2 |
| 3,217,208 | 11/1965 | Castro | 317—101 |

JOHN F. COUCH, *Primary Examiner.*

S. WEINBERG, *Assistant Examiner.*